March 12, 1940.    J. H. JEFFREE    2,193,422
OPTICAL DEVICE
Filed Jan. 23, 1937    2 Sheets-Sheet 1

Inventor:
J. H. Jeffree

March 12, 1940.  J. H. JEFFREE  2,193,422
OPTICAL DEVICE
Filed Jan. 23, 1937   2 Sheets-Sheet 2

Inventor:
J. H. Jeffree

Patented Mar. 12, 1940

2,193,422

UNITED STATES PATENT OFFICE 2,193,422

OPTICAL DEVICE

John Henry Jeffree, Oxshott, England, assignor to Scophony Limited, Campden Hill, London, England, a company of Great Britain Application January 23, 1937, Serial No. 122,016 In Great Britain January 25, 1936

6 Claims. (Cl. 178—7.6)

The present invention relates to optical devices suitable for use in television systems particularly systems of the kind described in British Patent Specification No. 433,945, certain features of which are described and claimed in my copending United States application Serial No. 3,062, issued into Patent 2,140,584. My present application forms a continuation in part of my said co-pending application.

In television systems employing mechanical scanning devices such as mirror drums, it is desirable to reduce, in the direction of its motion, the dimension of the scanner which produces the high speed component of scanning. To accomplish this it is necessary to employ a scanning light beam which has a very small light grasp in this dimension. The meaning of the term "light grasp" may be explained as follows.

It is well known in optics that the quantity of light in a light beam which may be termed the "light flux" depends not only on the brightness of the source and analogous factors, but also on geometrical factors. For a symmetrical beam, either converging or diverging, this geometrical factor may be defined as the product of the area of the exit pupil into the solid angle of divergence of the beam. This factor (in the symmetrical case) remains constant, no matter what reflections or refractions the beam may undergo, so long of course as the beam is not restricted in any way by any stops or screens. This geometrical factor may be referred to as the "total light grasp." The product of the width of the exit pupil in any one direction and the angle of divergence of the beam in that direction is termed the "light grasp" in that direction. The product of the light grasp in one direction and that in a perpendicular direction gives the total light grasp of the beam, thus a non-symmetrical beam will have two different light grasps in two mutually perpendicular directions.

Figure 1:
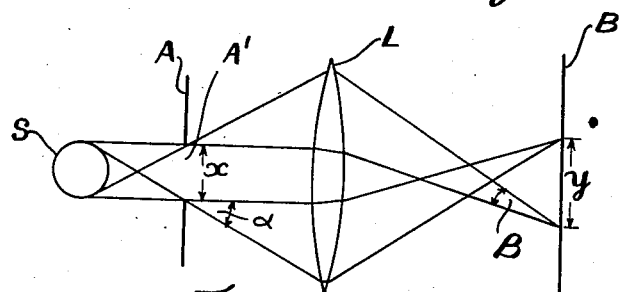

This may be made clearer by reference to Fig. 1 of the accompanying drawings, which shows a diaphragm stop A having a slit aperture A', the slit being illuminated by a light source S. An image of this slit is formed on a screen B, by a lens L. In the plane of the paper, the light grasp as defined above is given by $x\alpha$, where $x$ is the width of the slit $A^1$ in the plane of the paper and $\alpha$ is the angle of divergence of the beam, that is the angle subtended by two rays one from each of the two extreme ends of the light source S at any point in the slit $A^1$. It will be seen that for a point source the light grasp is zero. This is so because a point source, having zero area can give out no light, and represents a purely hypothetical case. If $y$ is the width in the same plane of the image formed on the screen B, then, assuming the angle $\alpha$ to be small, from the geometry of the figure, $$\frac{x}{y}=\frac{\beta}{\alpha}$$

where $\beta$ is the angle of convergence of the two rays referred to above, from the lens L. Thus $x\alpha = y\beta$; now $y\beta$ is the light grasp of the beam converging onto the screen B, and this is equal to the light grasp of the beam emerging from the slit, as proved above. This simple example will serve to elucidate the statements made in the previous paragraph.

Now the beam of light issuing from a normal light source, such as an arc or an incandescent lamp placed behind a symmetrical aperture in a screen has a fairly large light grasp in any two mutually perpendicular directions. To obtain from this beam a beam having a smaller light grasp in one direction than in a second direction perpendicular to the first, it has hitherto usually been necessary to include a screen in the path of the beam, the screen having a very narrow slit through which the light is transmitted, with the result that a large proportion of the emitted light is wasted.

It is also possible to produce from a light source, such as an arc, a flat beam of light by means of an optical system which includes lenses having no power in one plane, i. e., cylindrical lenses. With such systems it is found that a flat beam of very narrow width cannot be produced, owing to the finite size of the light source; further a beam of light from a light source of finite size cannot be rendered parallel or nearly parallel, but will always contain converging or diverging rays.

One object of the present invention is to obtain a beam of light having a very small light grasp in one direction without loss of efficiency.

Another object of the invention is to provide an optical device which decreases the light grasp of a beam incident thereon in one direction and effects a corresponding increase in the light grasp of the beam in a direction at right angles to the first direction.

Figure 2:
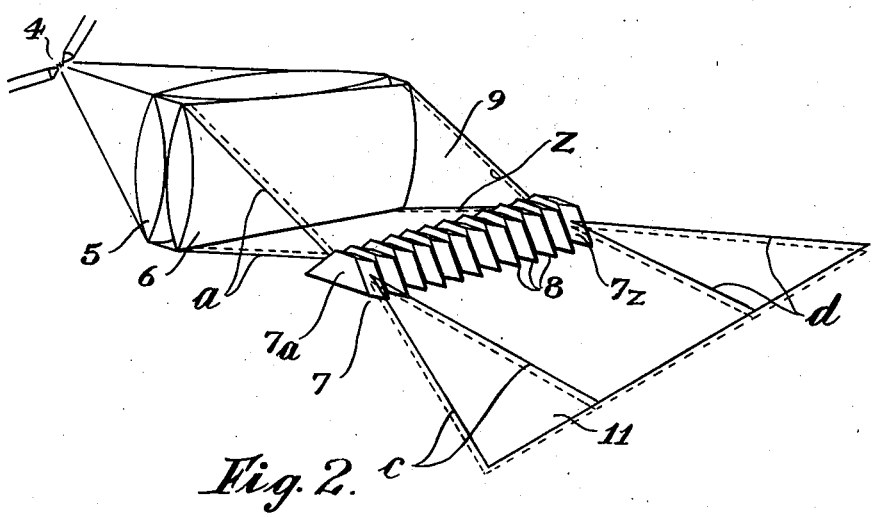

The preferred optical device includes transforming means in the form of two staircases of reflecting surfaces inclined with respect to one another, such a device being described in detail in my Patent No. 2,161,299, issued June 6, 1939, but the transforming means may also have the form of one of the stepped devices illustrated in Figs. 2, 13 and 14 of British Patent Specification No. 433,945 referred to above.

Alternatively the transforming means may, as described in British Patent Specification No. 433,945, comprise an optical system including one or more cylindrical lenses the axis of symmetry of each cylindrical lens being inclined with respect to the directions of the maximum and minimum light grasp of the beam.

Figure 3:
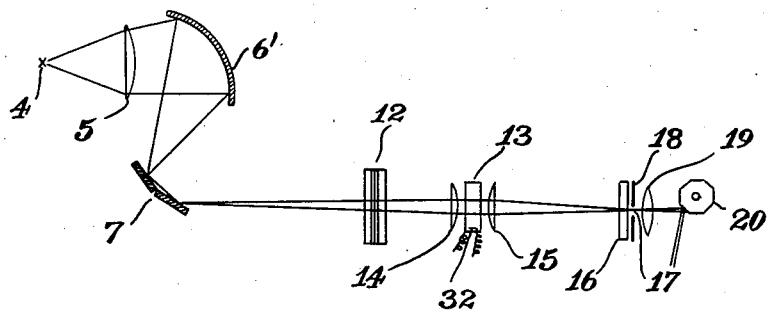
Figure 4:
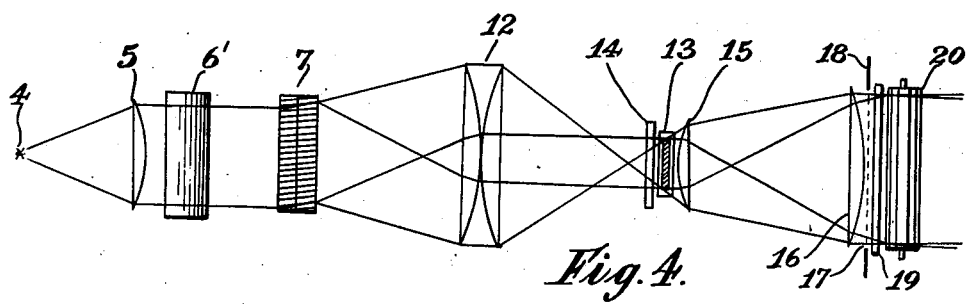
Figure 5:
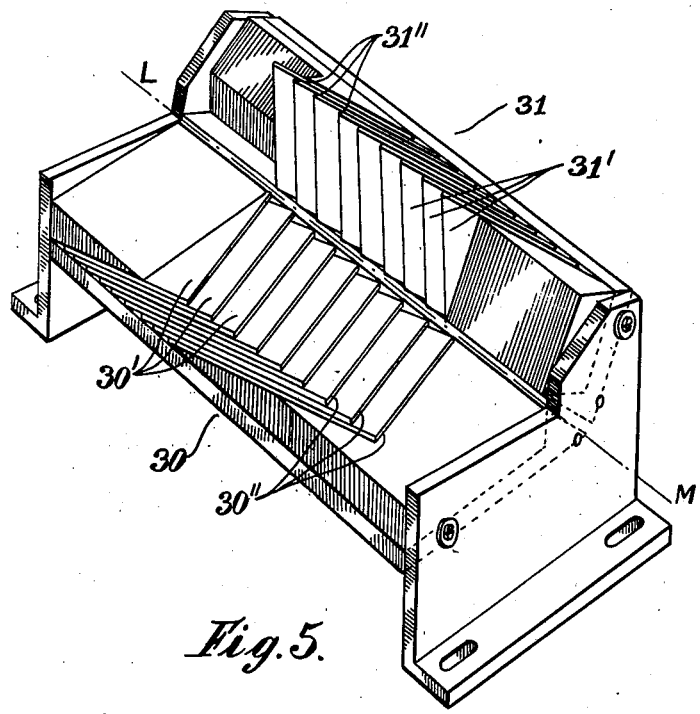

A preferred embodiment of the invention will now be described by way of example with reference to Figs. 2 to 5 of the accompanying drawings in which:

Fig. 2 shows diagrammatically an optical device by which the desired beam can be produced, Figs. 3 and 4 are diagrams in elevation and plan respectively showing, by way of example, how a beam produced by an optical device according to the present invention may be used in a television receiver, and Fig. 5 shows a preferred form of a part of Fig. 2.

Referring to Fig. 2, the light from a light source such as an arc 4 falls on a lens combination consisting of a spherical lens 5 and a cylindrical lens 6. It will be assumed for the sake of clearness and description that the plane in which the cylindrical lens 6 has no focusing power is a horizontal plane. The power of the spherical lens 5 is arranged to be such that the beam issuing therefrom is substantially parallel, as far as the dimensions of the source 4 will allow. The cylindrical lens 6 converges this light in a vertical plane, but has no power in a horizontal plane. Consequently the beam of light 9 issuing from the lens combination 5, 6 is wedge-shaped. The light grasp of the beam issuing from the lens combination is relatively large. As explained above, the light grasp of a beam of light is not affected by passing the whole beam through a lens.

In the path of this intermediate wedge-shaped beam 9 from the lens combination 5, 6, and near to the apex of the wedge there is placed an optical transforming device 7 comprising a number of narrow staggered right angled prisms 8 arranged as described in my co-pending application Serial No. 3,062 referred to above. The contiguous surfaces of the prisms are arranged as 45° to the horizontal plane of Fig. 2. Each prism 8 receives a narrow wedge-shaped beam of light, those received by the two end prisms 7a and 7z being shown at a and z. As described in my co-pending application Serial No. 3,062 previously referred to, the light emergent from each prism will be turned through 90° relative to the incident beam. Consequently the beam emergent from the whole transforming device 7 will be constituted by a number of wedge-shaped beams diverging in a horizontal plane, and of small width in a vertical plane. Two of these beams, corresponding to the beams a and z are shown at c and d. The light grasp of each emergent wedge is large in a vertical direction but small in a horizontal direction. Consequently in the horizontal plane, the emergent beam 11 is wide and strongly divergent and its light grasp in this plane is consequently increased. In the vertical plane the emergent beam 11 is substantially parallel and is very thin, and its light grasp in this plane has been consequently reduced. As a result, the total light grasp of the beam has not been changed, but the beam has been given the form of a flat sheet of light.

In Fig. 2 the transforming device 7 has, for the sake of ease of description, been shown as comprising a number of staggered right angled prisms. Preferably however, the transforming device is of the kind described and claimed in co-pending application No. 122,017; an example of this kind of device is shown in the accompanying Fig. 5. The device comprises two staircases 30 and 31 of plates of glass having the surfaces 30' and 31' silvered. The mean planes of the staircases, that is the planes containing the edges of the stairs of the staircases, are at an angle to one another, and the risers 30" and 31" of each staircase face towards opposite ends of the assembly.

In using such a device in the arrangement of Fig. 2, the apex line of the wedge shaped intermediate beam 9 falling on the first staircase 30 is arranged to be parallel to the junction line LM of the mean planes of the staircases. The light is reflected from the silvered surfaces 30' on to the silvered surfaces 31' of the second staircase 31 whence it is reflected to form the beam 11 of Fig. 2. A fuller description of the device shown in Fig. 5 is given in my Patent No. 2,161,299, issued June 6, 1939.

In Figs. 3 and 4 is shown the application of the present invention to television receiving apparatus. In these figures, light from a light source 4 is projected on to a spherical lens 5 and thence on to a cylindrical mirror 6', which condenses the light from the lens 5 into a wedge-shaped beam. In Fig. 4, which represents a plan view of Fig. 3, the spatial distribution of the lens 5 and mirror 6' and the transforming device 7 have not been accurately represented. The transforming device 7 which is placed near the line of focus of the light from the mirror 6' has the form shown in Fig. 5.

The light from the transforming device 7 emerges as a flat beam having a large divergence and light grasp in the plane of Fig. 4 and being nearly parallel and having small light grasp in the plane of Fig. 3. The light is passed through a cylindrical condensing lens system 12 having no power in the plane of Fig. 3. In the plane of Fig. 4 this lens system converges the light on to a light modulator 13, which preferably has the form described and claimed in my co-pending application Serial No. 8,451. One form of the device described in the specification of that application comprises a transparent wave-bearing body in which there are produced high frequency mechanical waves, modulated in accordance with the oscillations (in this case the picture signals to be reproduced) with which it is desired to modulate the light beam. The mechanical waves may be generated by a piezo-electric crystal 32 and travel upwards parallel to the plane of Fig. 3. The light beam passing through the body becomes resolved, owing to interference effects produced by the high frequency mechanical waves, into a beam maintaining its normal direction and diffracted beams, the amount of light in the beam maintaining its normal direction depending on the amplitude of the oscillations with which the high frequency mechanical waves are modulated.

By means of lenses 14, 15 and 16 the beam is focused on to the slit 17 in the screen 18, this slit serving to arrest the diffracted portion of the light from the modulator 13. The light then passes through the cylindrical lens 19 which converges the beam on to a high speed scanner 20, which gives the beam a component of a scanning motion in the direction of its smaller light grasp, i. e. in the plane of Fig. 3. This scanner preferably has the form shown in Fig. 3 of my co-pending application Serial No. 3,062. The remainder of the apparatus preferably is of the form shown in Fig. 2 of that co-pending application, comprising a transforming device for changing the direction of motion of the beam relative to the beam itself, a low-speed scanning device for giving the second component of a scanning motion, together with a lens system for focusing the beam into a spot upon a screen.

The present invention is however not concerned with this part of the apparatus. The device of this invention may be used for any purpose for which a thin flat sheet of light may be required, and is not solely applicable to television systems.

It is to be understood that the number of prisms used in the arrangement of Fig. 2 and the number of steps in the staircases of arrangements employing devices such as are shown in Fig 5 may be chosen according to circumstances since the thickness of the emergent beam 11 in Fig. 2 is governed by the thickness of the prisms or steps.

I claim:

1. An optical device for transforming a beam of light having a relatively small light grasp in a first direction and a relatively large light grasp in a second direction at substantially right angles to said first direction, particularly for television and like apparatus, comprising, in combination, an optical system to be arranged in the path of a light beam, said system constituted to project said light beam as an intermediate wedge-shaped beam converging in said first direction, a transforming means arranged across the path of said intermediate wedge-shaped beam near its apex, said means comprising a plurality of optically active surfaces in stepped relation to one another, each of said surfaces arranged to receive a different elemental part of said wedge-shaped beam and being constituted to twist said elemental part falling thereon through substantially 90° whereby a beam of light emergent from said transforming means results having a relatively small light grasp in said first direction and a relatively large light grasp in said second direction.

2. An optical device according to claim 1, wherein said transforming device has the form of a plurality of staggered right-angled prisms having parallel opposed surfaces arranged contiguously.

3. An optical device according to claim 1, wherein said transforming device comprises two staircases having reflecting treads, said staircases being arranged with their mean planes inclined relative to one another.

4. An optical device according to claim 1, wherein said transforming device comprises a plurality of laminae having parallel opposed major surfaces arranged contiguously and edge surfaces staggered to form a staircase.

5. A device according to claim 1, wherein said optical system comprises a spherical lens and a cylindrical lens acting in co-operation.

6. A device according to claim 1, wherein said optical system includes a cylindrical mirror.

JOHN HENRY JEFFREE.